(12) United States Patent
Sharpe et al.

(10) Patent No.: US 7,014,775 B2
(45) Date of Patent: Mar. 21, 2006

(54) METHOD FOR MIXING ADDITIVES WITH SLUDGE IN A POWERED LINE BLENDER

(75) Inventors: Phil E. Sharpe, Seattle, WA (US); Jay G. Dinnison, Seattle, WA (US); Steven Drury, Tacoma, WA (US)

(73) Assignee: Sharpe Mixers, Inc., Seattle, WA (US)

( * ) Notice: Subject to any disclaimer, the term of this patent is extended or adjusted under 35 U.S.C. 154(b) by 0 days.

(21) Appl. No.: 10/923,260

(22) Filed: Aug. 20, 2004

(65) Prior Publication Data

US 2005/0082232 A1   Apr. 21, 2005

Related U.S. Application Data

(62) Division of application No. 10/107,016, filed on Mar. 25, 2002, now Pat. No. 6,808,305.

(51) Int. Cl.
*C02F 11/14* (2006.01)

(52) U.S. Cl. .................. 210/709; 210/732; 210/738

(58) Field of Classification Search ............... 210/609, 210/709, 710, 732, 738, 739, 96.1, 143
See application file for complete search history.

(56) References Cited

U.S. PATENT DOCUMENTS

| | | | |
|---|---|---|---|
| 2,268,461 A | 12/1941 | Nichols | |
| 2,576,995 A | 12/1951 | Carvel | |
| 2,939,770 A | 6/1960 | Schwartzkopff et al. | |
| 3,469,948 A | 9/1969 | Anderson et al. | |
| 3,584,840 A | 6/1971 | Fuchs | |
| 3,605,775 A | 9/1971 | Zaander et al. | |
| 3,675,902 A | 7/1972 | Marshall | |
| 3,747,899 A | 7/1973 | Latinen et al. | |
| 3,751,010 A | 8/1973 | Latinen | |
| 3,752,447 A | 8/1973 | Chen | |
| 4,170,553 A | 10/1979 | Lang et al. | |
| 4,198,298 A | 4/1980 | Zuckerman et al. | |
| 4,347,135 A | 8/1982 | LaFosse et al. | |
| 4,427,336 A | 1/1984 | Lake | |
| 4,470,907 A | 9/1984 | Sencza | |
| 4,474,479 A | 10/1984 | Redelman | |
| 4,576,723 A | 3/1986 | Eisenlauer et al. | |
| 4,577,974 A | 3/1986 | Prough et al. | |
| 4,612,123 A * | 9/1986 | Eustacchio et al. ......... 210/709 |
| 4,642,222 A | 2/1987 | Brazelton | |
| 4,648,796 A | 3/1987 | Maghenzani | |
| 4,675,116 A | 6/1987 | Hoyland | |
| 4,688,945 A | 8/1987 | Brazelton et al. | |
| 4,778,280 A | 10/1988 | Brazelton | |

(Continued)

FOREIGN PATENT DOCUMENTS

DE   2353874   10/1973

(Continued)

OTHER PUBLICATIONS

Japanese Kokai No. 54-129747, Oct. 8, 1979, Tokyo Shibaura Denki, K.K. "Controlling of Quantity of Supplied Chemicals To Sludge Disposal Equipment", Application No. 53-36036. (1 page—in English language).

(Continued)

*Primary Examiner*—Peter A. Hruskoci
(74) *Attorney, Agent, or Firm*—R. Reams Goodloe, Jr.

(57) ABSTRACT

A powered in-line blender for mixing additives to sludges or other flowable liquid/solid mixtures. The blender is particularly useful in a method of blending polymer to municipal sewage sludges to improve the dewatering characteristics, and thus improving total costs for dewatering, handling, and disposal.

14 Claims, 11 Drawing Sheets

U.S. PATENT DOCUMENTS

| | | | |
|---|---|---|---|
| 4,797,550 A | 1/1989 | Nelson et al. | |
| 4,797,559 A | 1/1989 | Oblad et al. | |
| 4,810,371 A | 3/1989 | Fonseca | |
| 4,861,492 A | 8/1989 | Lehmkuhl et al. | |
| 4,935,151 A | 6/1990 | Do | |
| 4,981,367 A | 1/1991 | Brazelton | |
| 5,012,975 A | 5/1991 | Korsmeyer | |
| 5,018,870 A | 5/1991 | Brazelton et al. | |
| 5,018,871 A | 5/1991 | Brazelton et al. | |
| 5,032,287 A | 7/1991 | Salmond | |
| 5,061,456 A | 10/1991 | Brazelton et al. | |
| 5,075,012 A | 12/1991 | Busse | |
| 5,133,872 A | 7/1992 | Baldwin et al. | |
| 5,135,968 A | 8/1992 | Brazelton et al. | |
| 5,141,324 A | 8/1992 | Strand et al. | |
| 5,164,429 A | 11/1992 | Brazelton et al. | |
| 5,248,416 A | 9/1993 | Howard, Jr. | |
| 5,252,635 A | 10/1993 | Brazelton et al. | |
| 5,284,626 A | 2/1994 | Brazelton et al. | |
| 5,284,627 A | 2/1994 | Brazelton et al. | |
| 5,338,779 A | 8/1994 | Brazelton | |
| 5,366,622 A | 11/1994 | Geyer | |
| 5,401,402 A | 3/1995 | Christy et al. | |
| 5,662,805 A | 9/1997 | Cameron et al. | |
| 5,820,256 A | 10/1998 | Morrison | |
| 5,902,487 A * | 5/1999 | Pickering et al. | 210/709 |
| 5,971,600 A | 10/1999 | Paterson | |
| 6,036,355 A | 3/2000 | Yant et al. | |
| 6,808,305 B1 * | 10/2004 | Sharpe et al. | 366/168.1 |

FOREIGN PATENT DOCUMENTS

| | | |
|---|---|---|
| DE | 2942740 A1 | 5/1981 |
| DE | 3025521 | 1/1982 |
| DE | 3103968 A1 | 1/1982 |
| GB | 487137 | 6/1938 |
| GB | 1468811 | 3/1977 |
| GB | 1509969 | 5/1978 |
| GB | 1603681 | 11/1981 |
| JP | 54-129747 | 10/1979 |

OTHER PUBLICATIONS

Abstract, DE 2942-740 (Germany) Schulke & Mayr GMBH, "Disinfectant soln. Metering appliance—using mechanically coupled drives for water and concentrate pumps". (2 pages—in English language).

Abstract, DE 3025-521 (Germany) Klockner-Humboldt-Deutz, Flocculating Agent Feed To Centrifuge—is automatically regulated from readings of mixt. Feed and centrifuged liq., Jul. 5, 1980. (2 pages—in English language).

Dillon, Michael L., St. Clair, Kenneth A. and Kline, Phillip, H., Robbins & Myers, Inc. , "Predicting Flowrates From Positive-Displacement Rotary Pumps", Chemical Engineering, Jul. 22, 1985.

Pierce, Laurie, and Knight, Steve;, WET Water Environment & Technology, "Make the Connection", Operations Forum, May 2002, pp. 52-54.

Pumping of Liquids and Gases, undated—author unknown.

* cited by examiner

METHOD FOR MIXING ADDITIVES WITH SLUDGE IN A POWERED LINE BLENDER

RELATED PATENT APPLICATION

This application is a Divisional of U.S. application Ser. No. 10/107,016 filed Mar. 25, 2002, now U.S. Pat. No. 6,808,305, issued Oct. 26, 2004, entitled "METHOD AND APPARATUS FOR MIXING ADDITIVES WITH SLUDGE IN A POWERED LINE BLENDER" the disclosure of which is incorporated herein in its entirety by this reference.

COPYRIGHT RIGHTS IN THE DRAWINGS

A portion of the disclosure of this patent document contains material that is subject to copyright protection. The applicant no objection to the facsimile reproduction by anyone of the patent document or the patent disclosure, as it appears in the Patent and Trademark Office patent file or records, but otherwise reserves all copyright rights whatsoever.

TECHNICAL FIELD

This invention is directed to the field of blenders, and more particular, to blenders adapted for mixing polymers with sludge.

BACKGROUND

Various mixing devices have long been utilized for mixing polymeric flocculants to improve their contact with a low solids mixture. A water based slurry containing solids from which the water is to be removed is a common situation which presents itself in many industries. Many techniques have been utilized in handling such slurries (whether sludges or whether having other physical properties) for enhancing water removal, such as improved centrifugation or filtration, including vacuum filtration. In many of such water removal process techniques, the dewatering can be even further enhanced via the addition of a suitable polymeric substance. Suitable polymeric substances vary widely, depending upon the substance to be dewatered and its chemical, physical, and electrostatic properties. In many sludge handling applications a suitable polymer might be a high molecular weight and high charge density cationic polymer. However, in many commonly encountered applications, such as in the treatment of sewage sludge, achieving enhanced water removal even with addition of a suitably selected polymer is often difficult to achieve. One approach often used, which is rather expensive, is simply to increase the polymer dosage. However, in some cases, even that technique does not provide much improvement. In such cases, the ultimate solids dryness remains sufficiently low that significant savings in further handling costs (particularly with respect to charges for drying, transportation, and disposal) could be achieved if only the polymer addition achieved the performance results in full scale that were (and sometimes still are) seen in comparable bench scale trials.

A common problem encountered in the methods heretofore tried which are of interest to us is that polymer addition is often done only in conjunction with pumps designed to move the material. In such cases, the amount of work done on both the sludge and to the polymer being added has been primarily (if not totally) dependent on the work that the pump device, such as a progressive cavity pump impeller, did in the process of moving the sludge or slurry from one location to another. Thus, those methods inevitably leave the results in the hands of the selection of a few variables, namely polymer selection and dosage rate, since the pump itself is usually provided for a fixed service (i.e., flow, impeller rpm, and pressure differential). It is often rather difficult (if not impossible) to accomplish a quick adjustment of the pump, so, plant workmen are often found to be simply too lazy or too pressed for time to properly make use of the available adjustments, if any. So, a commonly encountered situation is that vendors of polymers are called in to test their various products, at different dosages, until an optimum product and dosage selection are attained to most cost effectively achieve the desired dewatering results.

Thus, there remains a continuing and as yet unmet need for a device that would provide immediate and precise control over polymer mixing, and which separates the work of sludge/polymer mixing from sludge pumping, and which can withstand the hazards inherent in sludges from sources such as municipal wastewater treatment plant operations.

BRIEF DESCRIPTION OF THE DRAWING

In order to enable the reader to attain a more complete appreciation of the invention, and of the novel features and the advantages thereof, attention is directed to the following detailed description when considered in connection with the accompanying drawings, wherein.

The foregoing figures, being exemplary, contain various elements that may be present or omitted from actual implementations depending upon the circumstances. An attempt has been made to draw the figures in a way that illustrates at least those elements that are significant for an understanding of the various embodiments and aspects of the invention. However, various other elements of an in-line blender and of a method of mixing polymer with sludge are also shown and briefly described to enable the reader to understand how various optional features, methods, or structures may be utilized in order to provide a useful in-line blender application that easily accommodates adjustment of polymer application rates and of the mixing work accomplished on a sludge/polymer mixture, in order to achieve optimization of sludge dewatering and drying processes.

DETAILED DESCRIPTION

Figure 1:
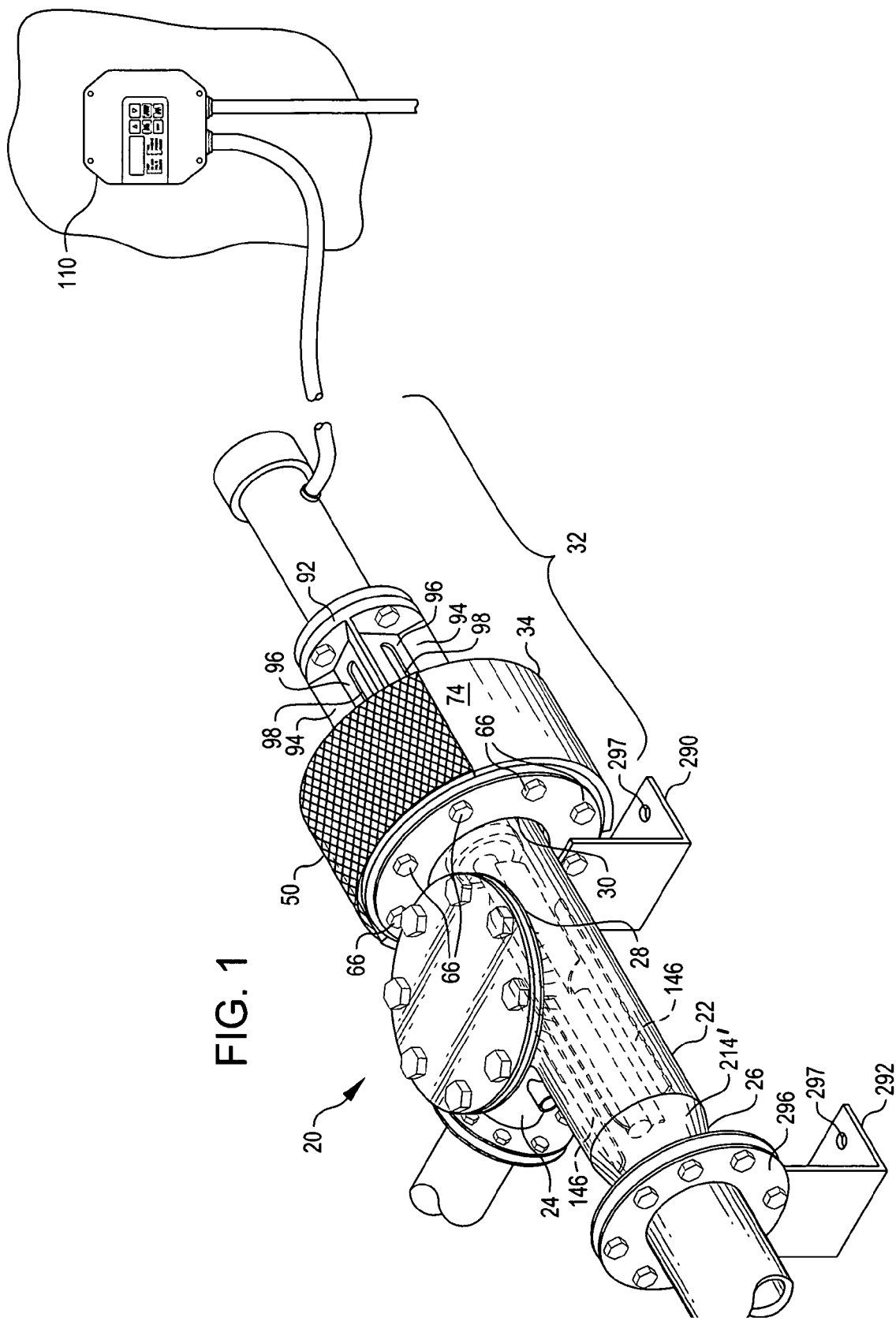
FIG. 1 is a perspective view of a novel in-line sludge blender, showing the blender housing with inlet, outlet, cleanout port, and internal baffles, a non-ragging impeller, and support mounts for supporting the blender at a desired location, as well as the mixer drive including the pipe housing for housing a mechanical seal (not shown), a bearing spool, and a motor and motor remote control unit.

Attention is directed to FIG. 1, where a novel in-line blender 20 is shown. The blender 20 includes a blender housing 22 with a first nozzle 24 which in one configuration serves as an inlet, a second nozzle 26 which in that same configuration serves as an outlet, a cleanout port 28, and a mixer mounting nozzle 30 to which is affixed the mixer drive components 32. In the embodiment illustrated in FIGS. 1 and 7, the mixer drive components include (a) a pipe housing 34 having a bushing 36 to which a seal housing 38 is affixed within by the attachment ring 40, (b) a bearing spool 42 with bearing 44 (see FIGS. 4 and 8), and a drive motor 46. An access cover 50 may be provided for convenient access and seal housing 38. Within the blender housing 22, a non-ragging impeller 60 is provided. Such an impeller 60 design is especially of value in applications of the in-line blender 20 to the mixing of polymer with municipal sewage sludge, where items such as hair and feminine napkins or tampon residuals tend to catch on improperly designed mixer impellers and quickly build up on a shaft which is then found less than totally effective, or even completely inoperative, having been wound up with balls of hair, string, and fiber. Such a phenomenon also tends to be hard on mixer components, mechanically, especially on bearings and seals.

An attachment system such as flange 62, attachment ring 63, gasket 64, and bolt 66 with matching nut 68 is used to sealingly affix the first component of the mixer drive 32, namely the nozzle side 70 of pipe housing 34, to the mixer mounting nozzle 30. As illustrated, the pipe housing 34 is provided in the shape of a tubular cylindrical component having nozzle side 70 with sealing face 72 (see FIG. 7), a partial tubular sidewall 74 of a length $L_{34}$ sufficient to accommodate the length $L_{38}$ of seal housing 38 and also to provide access to nuts 68, and a rear or bearing spool side 76 in the shape of an annulus with central hole defined by edge wall 78 sized and shaped to accommodate shaft 120 of impeller 60, as well as to provide space for bearing 44 affixed to bearing spool 42. Bearing spool 42 is attached to the rear side 76 of the pipe housing 34 by suitable fasteners such as bolts 80 sized and shaped to fit threads in apertures 82 through rear side 76 of the pipe housing 34, or by alternate bolt and nut fastener system. The motor 46 is operable affixed to bearing spool 42 via suitable fastener system, details of which may vary to suit a particular design and which may be easily configured by those of ordinary skill in the art and to which this disclosure is directed. Bearing spool 42 may be provided in a unique design, where first 91 and second 92 attachment flanges are spaced apart by a plurality of radially inward partitions 94, and wherein adjacent partitions have an inward root, and wherein the inward roots of adjacent partitions 94 are connected by an access plate 96 having therein an access aperture defined by edge wall 98 which provides visibility of and access to the coupling 100 (also see FIG. 11) which mechanically links and affixes the drive end 102 of shaft 120 to the shaft 104 of motor 46. In one embodiment the impeller 60 is configured for direct drive via motor 46. The bearing spool 42 is affixed to the bearing spool side 76 of pipe housing 34, and is centered along the shaft axis 122 of impeller 60, and includes a bearing 44 secured within the bearing spool 42.

Figure 2:
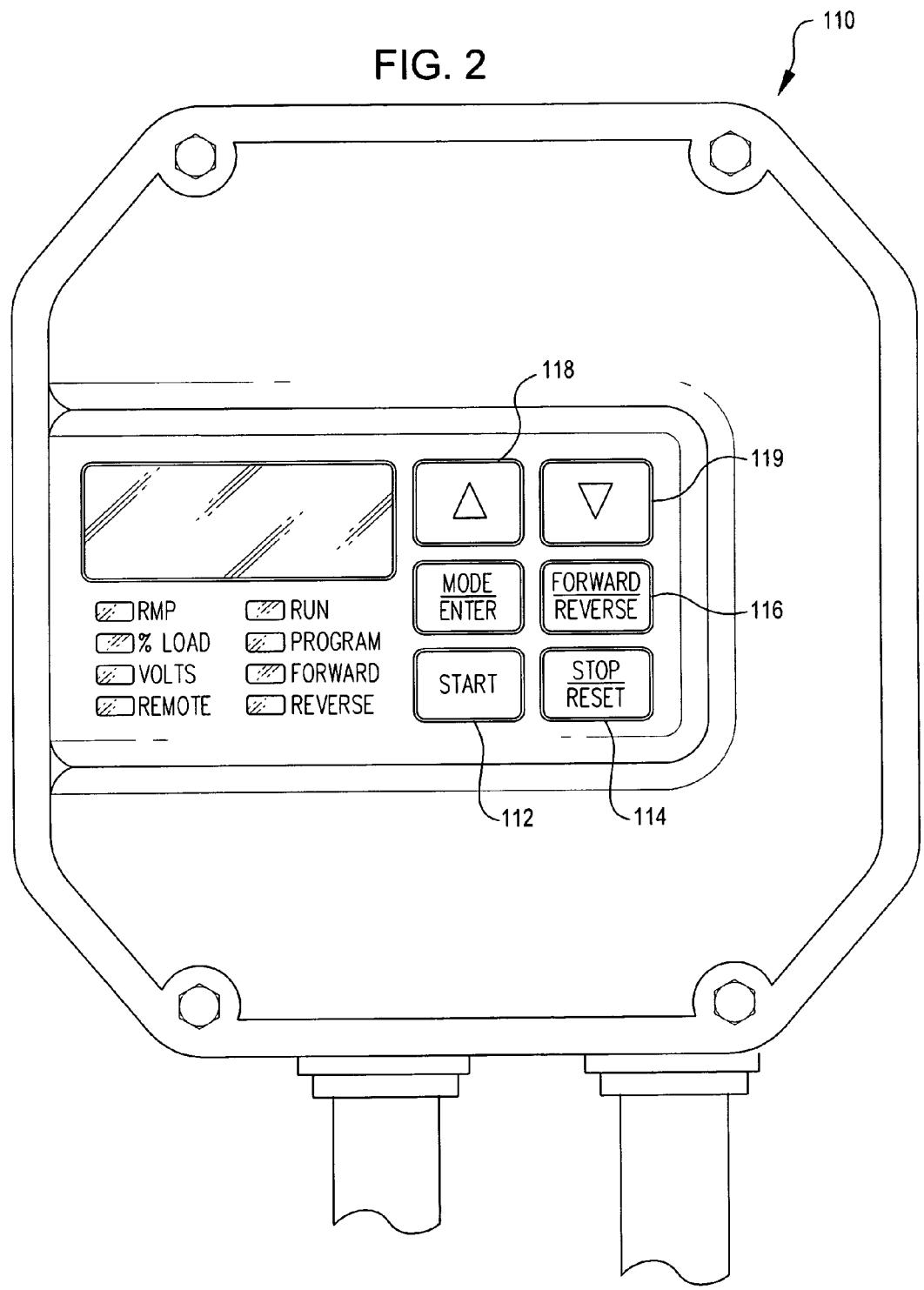
FIG. 2 provides a close up of one embodiment for a motor control unit, indicating the push button control for starting, stopping, and running the mixer forward and backward at various speeds, and the speed controls for increasing or decreasing the speed of the blender impeller.

FIG. 2 provides a close up of one embodiment for a motor control unit 110, indicating the push button control for starting 112, stopping or resetting 114, and running the mixer forward or reverse 116 at various speeds, which can be increased 118 or decreased 119, which speed controls enable adjustably increasing or decreasing the rotating speed of the blender impeller 60 to a selected or experimentally determined optimum speed. Appropriate indicator lights and readouts provide the RPM of the impeller 60, the percent of maximum load, and an indication of whether the blender is running in forward or reverse mode.

Figure 7:
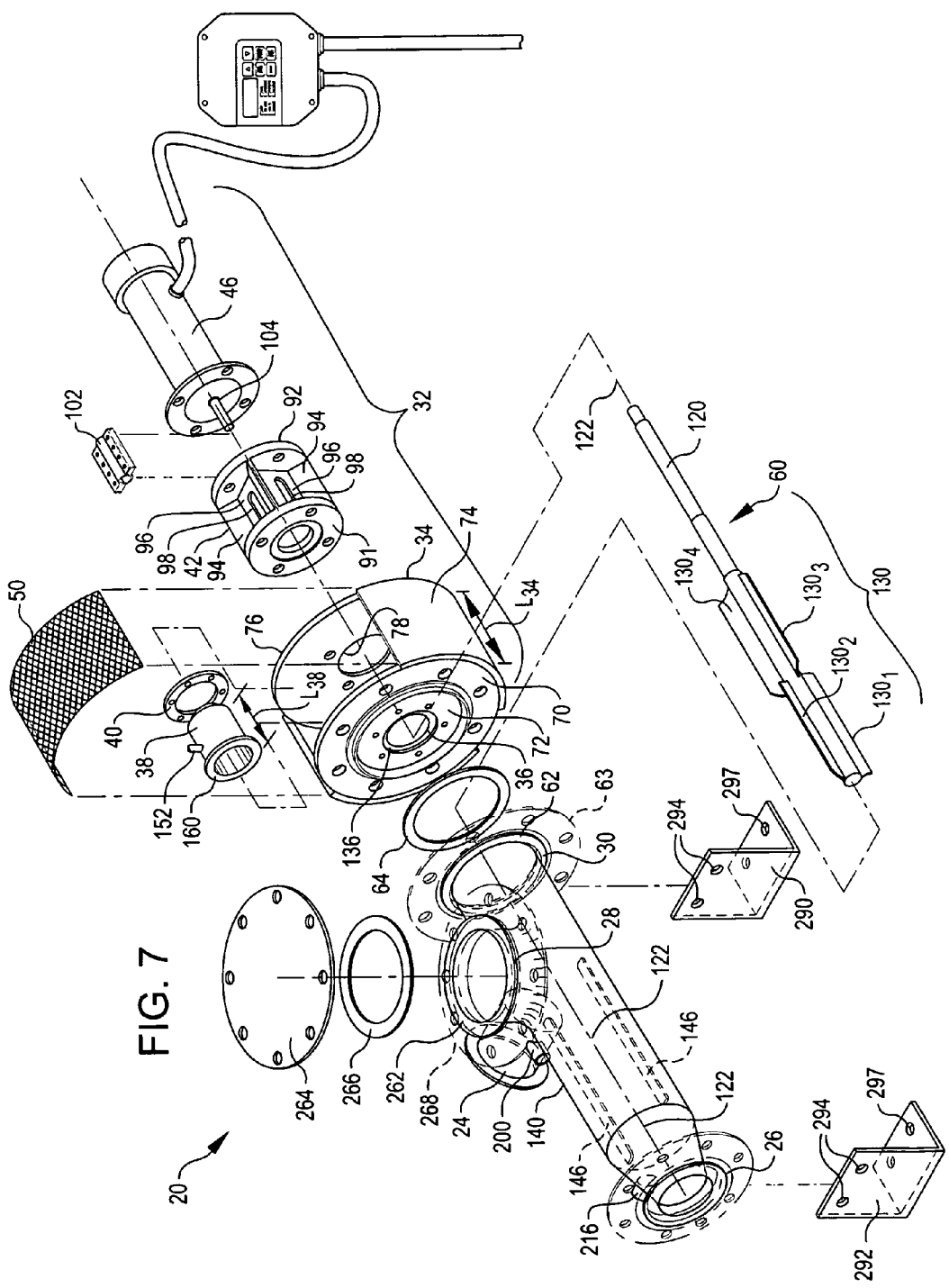
FIG. 7 is an exploded perspective of the various components of the blender, showing the various components thereof, including blender housing with a first nozzle, a second nozzle, a cleanout port, and internal baffles, a non-ragging impeller, and support mounts for supporting the blender at a desired location, along with a mixer drive including pipe housing for housing the seal housing and internal seal components, a bearing spool, and a motor, as well as an externally mounted motor remote control unit.
Figure 9:
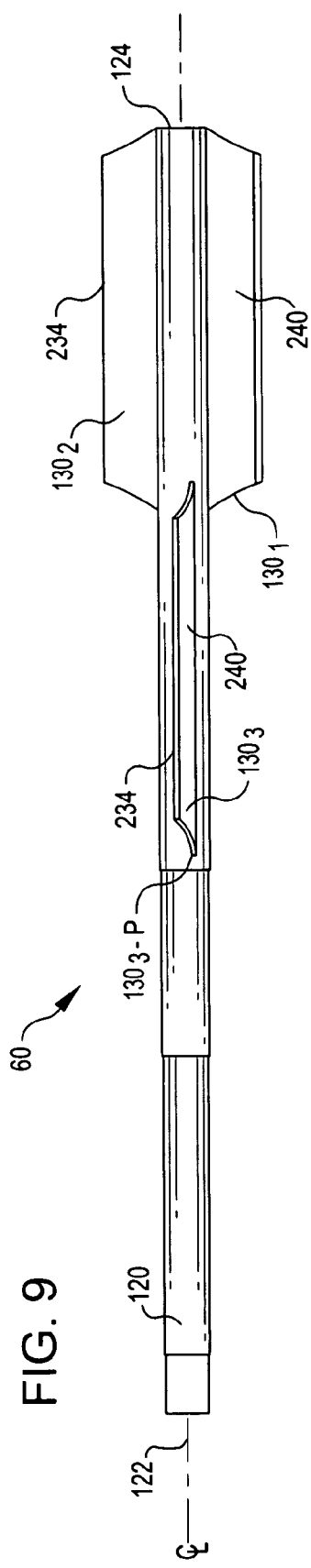
FIG. 9 is side view of one embodiment for a non-ragging impeller of exemplary design for construction of an in-line blender, and for the practice of the method of operation taught herein, showing along the shaft, from proximal end to distal end, the drive region, the sealing region, and mixer drive clearance region of the shaft which has an extremely short wetted shaft prior to impeller attachment, and one embodiment for a backward curved impeller blade design, both of which contribute to the success of the impeller for this service.

As easily seen in FIG. 9, and also clearly indicated in FIG. 7, the impeller 60 has a rotating shaft 120 extending along a longitudinal axis indicated by centerline 122. The shaft 120 has a distal end 124. The impeller 60 has a plurality of blades 130 attached to the rotating shaft 120. One or more of blades 130 is in an outermost, or most distal position, and one or more of blades 130 is in an axially innermost, or most proximal position. In FIG. 9, blades $130_1$ and $130_2$ are paired and are located in an axially outermost position, and blades $130_3$ and $130_4$ are paired and located in an innermost position. As shown an axially innermost blade, here blades $130_3$ and $130_4$ have proximal ends $130_3$-P and $130_4$-P (see FIG. 5) which are located spaced apart from but closely adjacent the mixer drive 32. As shown in FIG. 7, this just mentioned spacing is with respect to the wetted side 136 of bushing 36. Also, to achieve non-ragging performance, the plurality of blades 130 are configured to assure that, along the shaft axis, at least some of the blades 130 overlap lengthwise, (as shown, pairs of blades 130 overlap lengthwise) so that from said proximal end $130_3$-P and $130_4$-P of the innermost blade $130_3$ or $130_4$ to the distal end 124 of shaft 120, a bare rotating shaft (i.e., devoid of impeller blades) is substantially avoided.

In the embodiment illustrated in the figures herein, the blender housing 22 is provided with a main housing portion 140 having a cylindrical tubular configuration along a longitudinal axis having an interior housing wall 144. As illustrated, the blender housing 22 is provided with a plurality of baffles 146 that are mounted to the interior housing wall 144, In the configuration illustrated, the baffles 146 are provided as narrow, elongated structures extending from the interior housing wall 144 inward toward, but spaced apart from, the impeller 60. In one embodiment, baffles 146 are provided a baffle pairs $146_1$ and $146_2$, mounted in opposing fashion on the interior housing wall 144, as indicated in FIG. 5.

Figure 8:
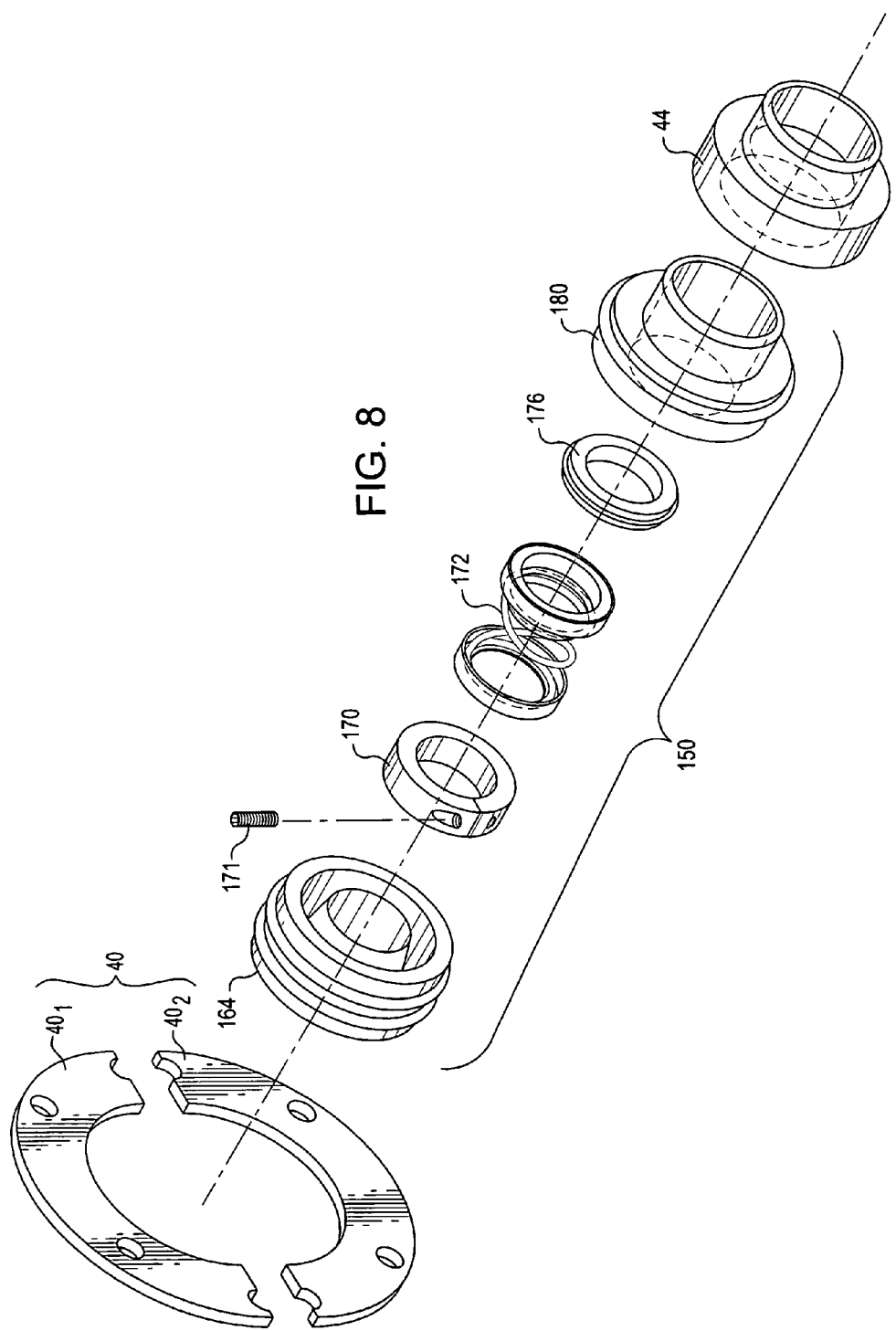
FIG. 8 is an exploded perspective of the various components of the seal, (including those components contained within the seal housing), as well as a mounting ring for securing the seal housing to the pipe housing, as well as a bearing which is located in the bearing spool (not shown here, see FIG. 7) located adjacent to the pipe housing.
Figure 11:
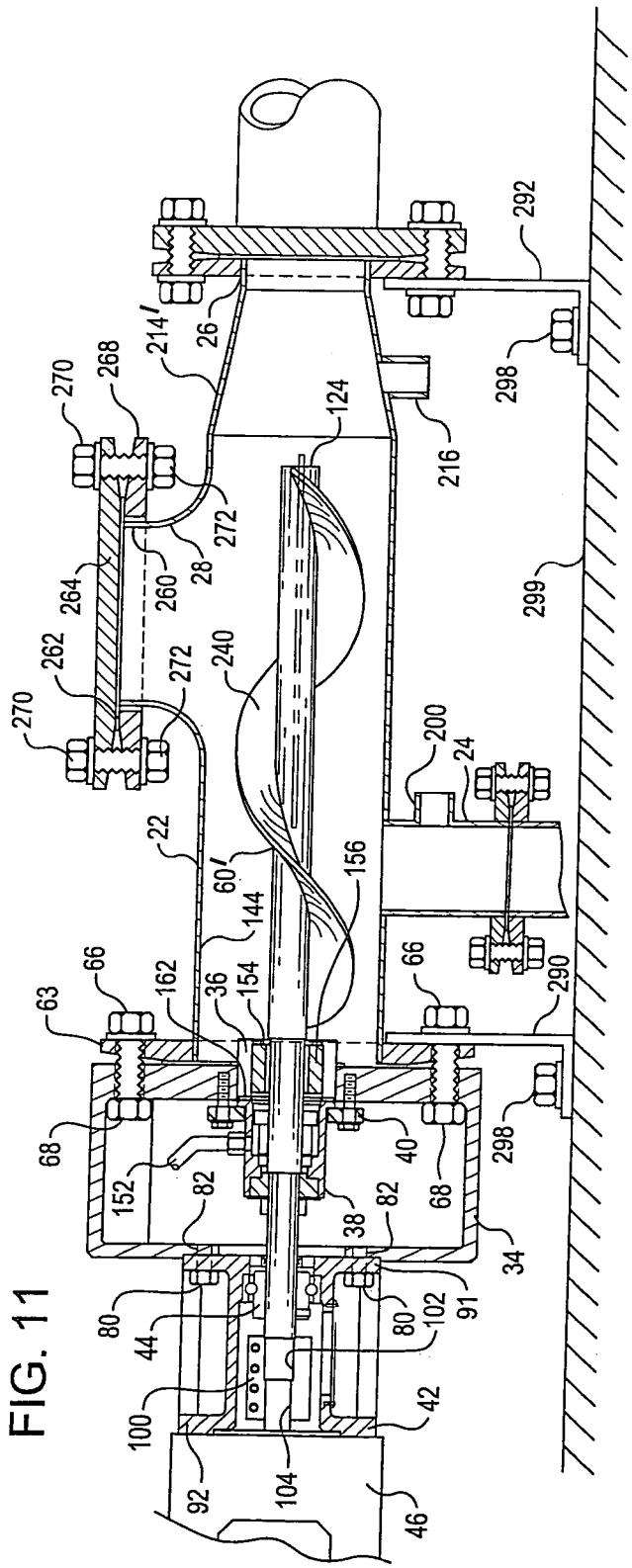
FIG. 11 is a vertical and longitudinal cross-sectional view of a blender, looking from the side into the internals of the blender housing, showing a non-ragging, screw type impeller, a cleanout port, a primary and a secondary polymer addition fittings, and mixer drive components, as well as mounting feet for supporting the blender on a desired substrate.

Turning now to FIGS. 7 and 8, the seal housing 38 is provided to confine mechanical seal components 150, as indicated in FIG. 8, and to provide a pressurizable compartment into which seal water is provided via fitting 152. A lip seal 154 and bushing 156, as shown in FIG. 11, in pipe housing 34 seal against rotating shaft 120 of impeller 60. The seal housing 38 has a bushing flange face 160 which seals against seal face 162 of bushing 156, as indicated in FIG. 11. Within seal housing 38 are provided a throttle or flow restrictor 164 which restricts the flow of water out from seal housing 38, a collar 170 which is affixed to shaft 120 via threaded pin 171 to compress spring 172 against a ceramic seal seat 176 and bearing 180, which is located at the motor side of seal housing 38, as is more evident in FIGS. 4 and 11. Although one exemplary design for a mechanical seal and seal housing 38 has been provided, it will be understood by those of ordinary skill in the art that various seal and bearing designs may be utilized without departing from the fundamental developments in the art provided by an in-line blender 20 as described and claimed herein.

Figure 5:
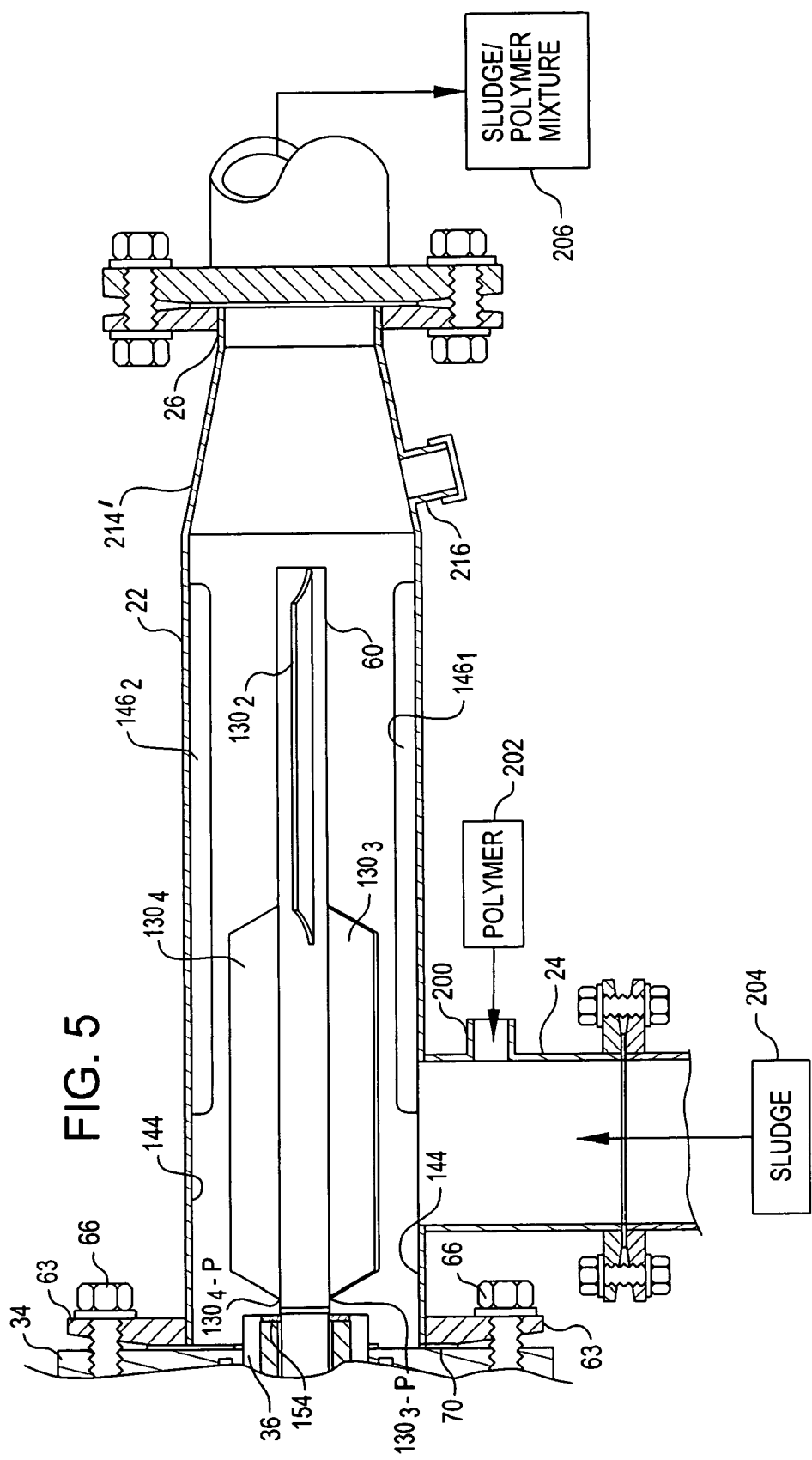
FIG. 5 is a horizontal and longitudinal partial cross-sectional view of a blender, looking from the top down into the internals of the blender, showing the blender housing, internal baffles, the non-ragging impeller, and the inlet and outlet nozzles and flanges, and a primary polymer addition fitting on a first nozzle (here the inlet), with block flow diagram indicating one possible flow configuration.
Figure 12:
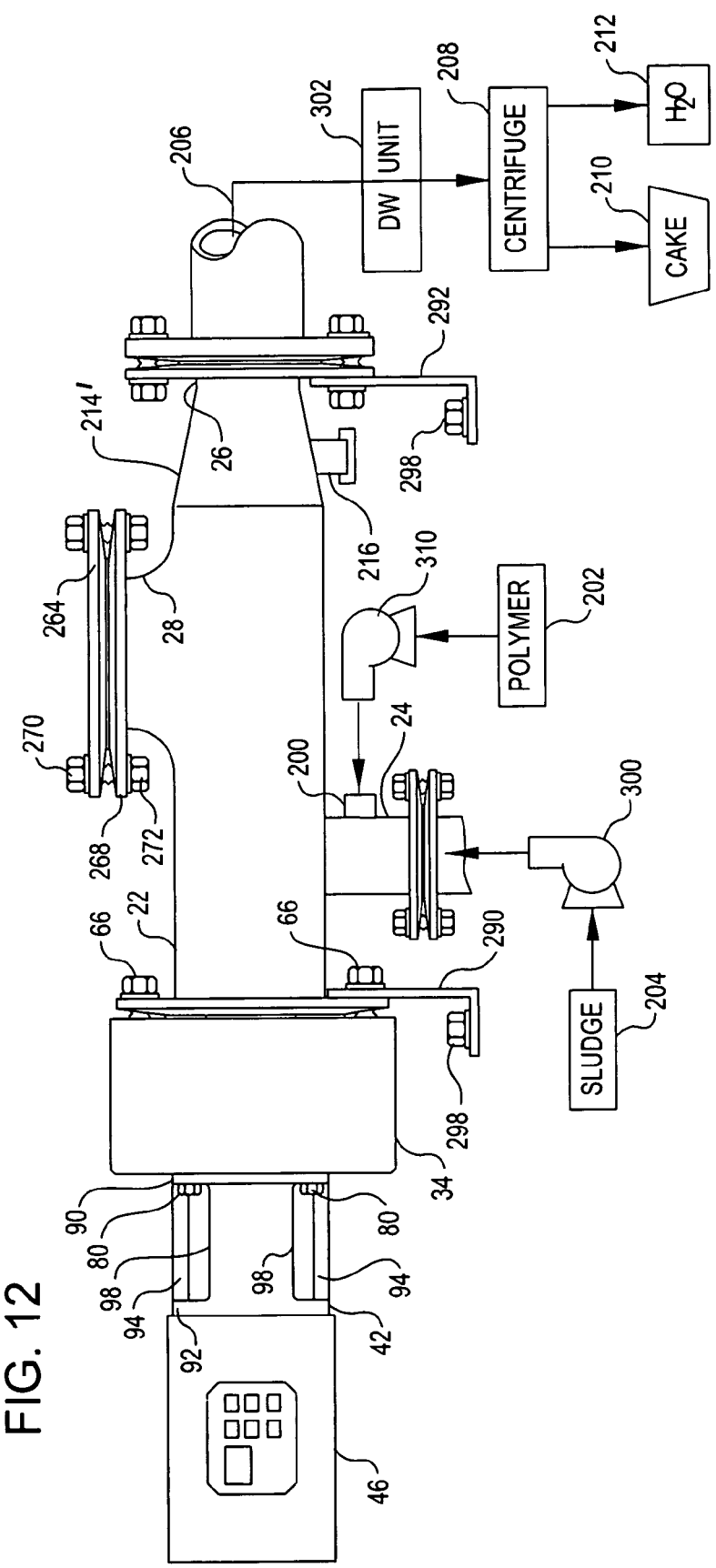
FIG. 12 is a flow diagram illustrating one embodiment for employing the blender depicted herein to add polymer to a sludge in a method for mixing polymer with sludge, followed by the further dewatering of the sludge/polymer mixture in a centrifuge to produce dewatered sludge cake and a clear centrate stream which is primarily water.

In order to receive an additive stream such as a liquid polymer, a first nozzle such as inlet nozzle 24 shown in FIG. 5 further includes an additive inlet fitting 200, which is adapted to receive a liquid stream containing an additive such as polymer 202 for mixing with a sludge stream 204, to create a sludge/polymer mixture 206 for feed to a dewatering device such as centrifuge 208 as shown in FIG. 12, which further dewaters the sludge/polymer mix 206 to create a relatively dry cake 210 and a relatively clear centrate or water stream 212.

Figure 4:
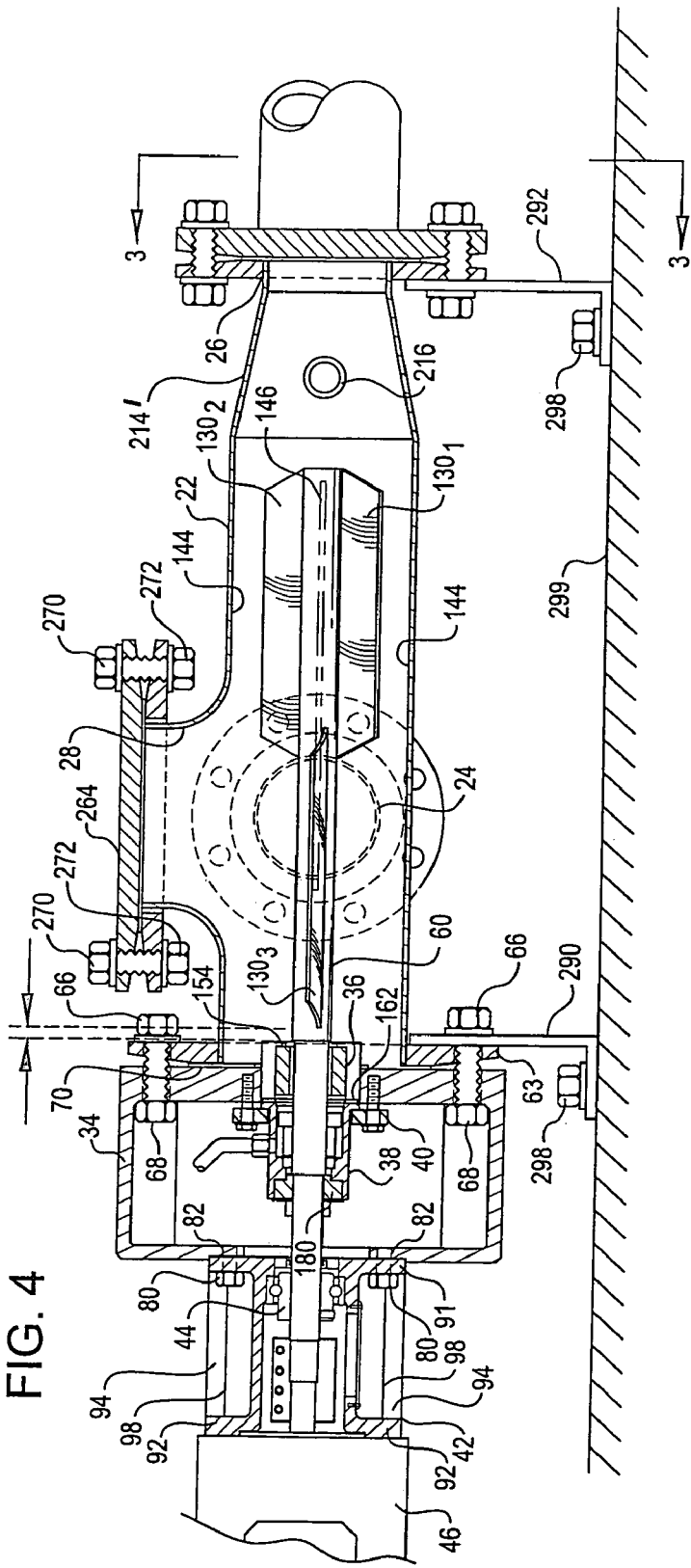
FIG. 4 is a vertical and longitudinal partial cross-sectional view of a blender, looking from the side into the internals of the blender housing, showing the non-ragging impeller, cleanout port, and the seal housing located within the pipe housing, a bearing spool, and motor.
Figure 6:
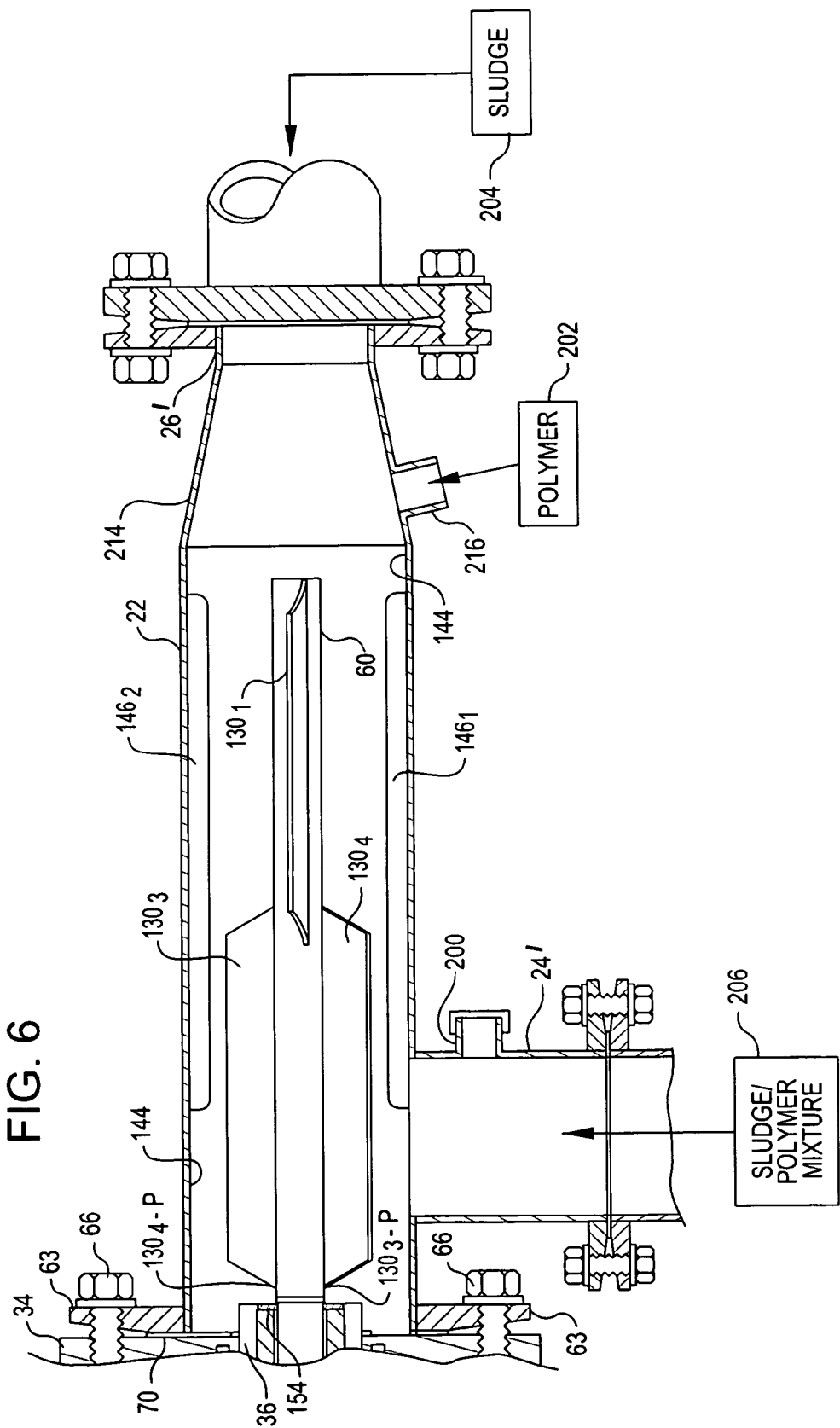
FIG. 6 is a horizontal and longitudinal partial cross-sectional view of a blender, similar to FIG. 5, looking from the top down into the internals of the blender, showing the blender housing, internal baffles, the non-ragging impeller, and the inlet and outlet nozzles and flanges, but now showing the blender in a secondary flow configuration, wherein the primary polymer addition fitting is capped on the first nozzle (which here serves as the outlet nozzle), but with a secondary polymer addition fitting in use on a second nozzle (which here serves as the inlet nozzle).
Figure 10:
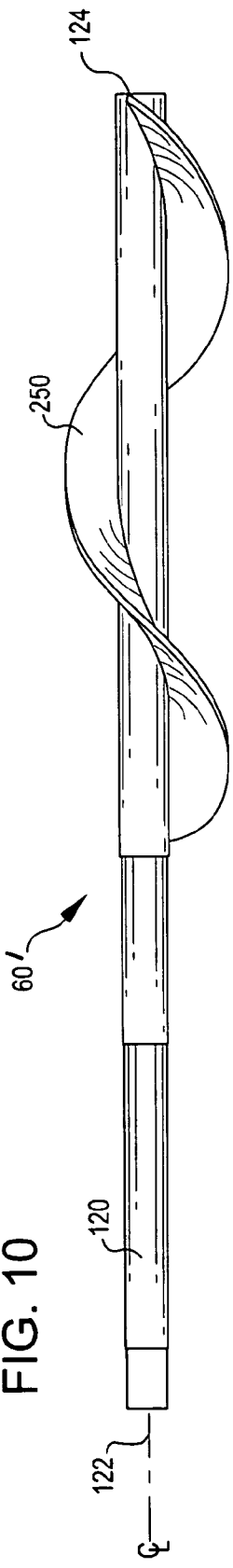
FIG. 10 is side view of another embodiment for a non-ragging impeller of exemplary design for construction of an in-line blender, and for the practice of the method of operation taught herein, showing along the shaft, from proximal end to distal end, the drive region, the sealing region, and mixer drive clearance region of the shaft which has an extremely short wetted shaft prior to impeller attachment, and one embodiment for an auger or screw type impeller blade.

In some applications, it is advantageous to use a "reverse flow" configuration as shown in FIG. 6, wherein a second nozzle such as tapered portion, here diverging nozzle 214 provided as part of nozzle 26' further includes the additive inlet fitting 216 which is adapted to receive a liquid stream containing an additive such as polymer 202. In such a case, the "forward flow" inlet 24 becomes an outlet 24'. In other words, an in-line blender 20 is provided in an arrangement, and with capped additive fittings as necessary, so that flow within the blender housing 22 can be (a) directed from mixer drive 32 toward the distal end 124, as shown in FIGS. 9–11, of the impeller 60, or (b) directed from the distal end 124 of the impeller 60 toward said mixer drive 32. When the blender 20 is configured for a "forward flow" mode, the blender housing 22 is of larger diameter than the outlet 26, and in such case, a converging nozzle 214' is provided as shown in FIGS. 4 and 5.

Figure 3:
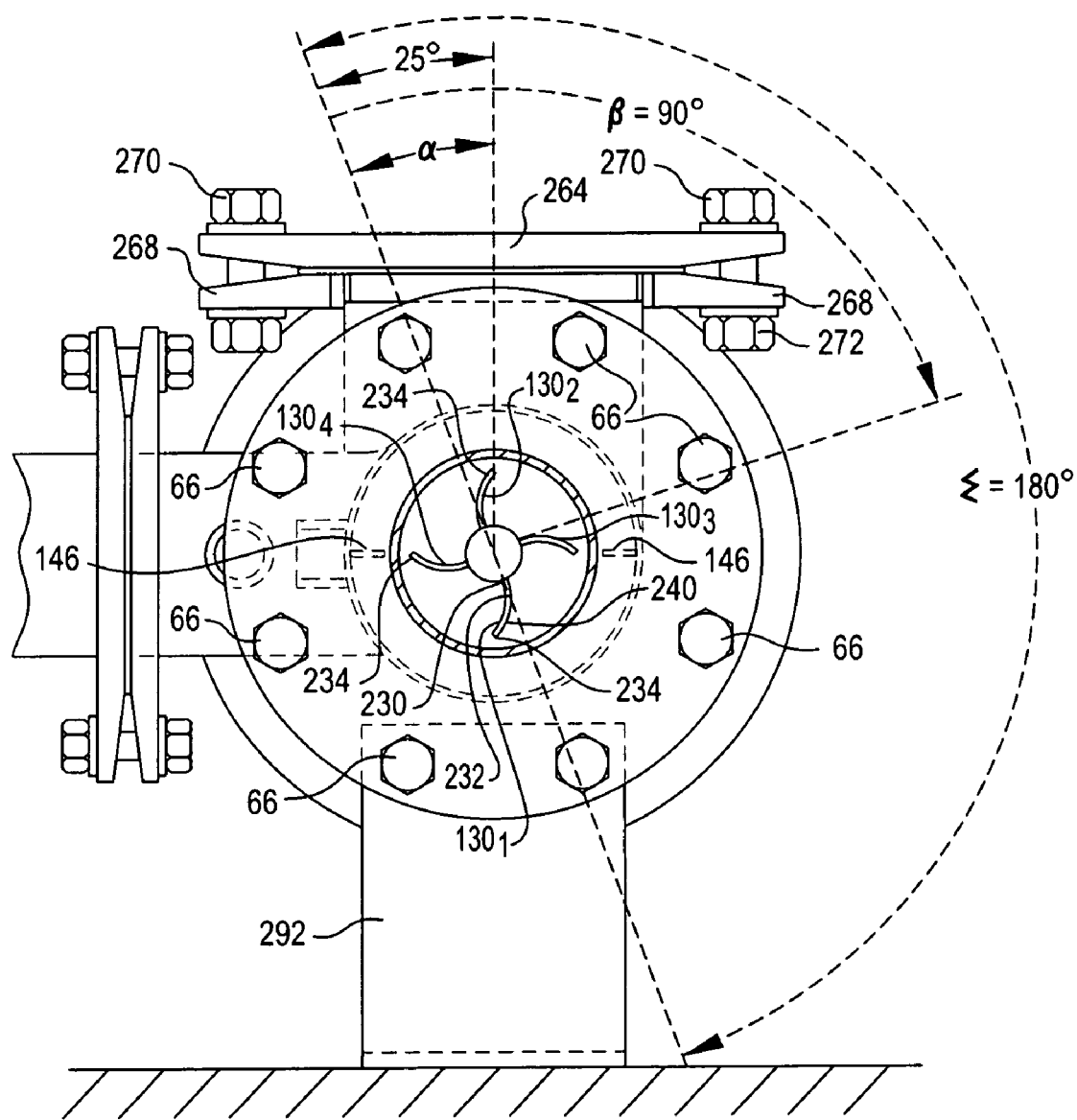
FIG. 3 is a vertical end view, taken as if looking back through section 3—3 of FIG. 4, showing the blender housing, outlet flange, inlet flange, cleanout flange and cover, a non-ragging impeller, and support mounts for supporting the blender.

As shown in FIG. 10, an impeller 60 can in one embodiment be provided with two pairs of paddle blades, specifically blades $130_1$ and $130_2$, and blades $130_3$ and $130_4$. Each one of these blades, as better seen in FIG. 3, have a root portion 230 extending radially from the shaft 120, and an outer portion 232 extending outward from the root portion 230 and ending in a tip 234. The outer portion 232 is radiused with respect to the root portion 230 to provide a convex leading surface 240 of each blade, $130_1$, etc. As noted in FIG. 3, in one configuration, the tip 234 ends at a location angularly rearward of the root portion 230 by a preselected angle alpha ($\alpha$) of about twenty five degrees. Also note that the successive blades $130_3$ and $130_4$ are mounted along the shaft 120 at uniform longitudinal spacing. As shown, successive blade pairs $130_1/130_2$, and $130_3/130_4$ are mounted at a radial displacement of 90°. In this manner, the when said blades are provided in mirror image pairs, the root portion of each one of the companion blade pairs is mounted at a radial displacement angle of sigma ($\Sigma$), here configured for 180°.

In one embodiment, as indicated in FIGS. 10 and 11, an impeller 60' can be provided mounted in cantilever fashion within a housing, with blades provided in the form of a screw type auger, having helical flytes 250.

For ease of inspecting, cleaning, and servicing the impellers 60 or 60', a cleanout access nozzle 260 has been provided. The nozzle 260 has a flanged outlet 262 sealed by a blind cover plate 264 removeably and sealingly secured to the flanged outlet 262 by seal 266, mounting ring 268, and appropriate fasteners such as bolts 270 and nuts 272. To support the in-line blender 20, a pair of support feet 290 and 292 are provided. In one embodiment, apertures 294 in support feet 290 and 292 are adapted for compatibility with the nut and bolt system used for affixing (1) the pipe housing 34 to the mixer mounting nozzle, and (2) for affixing outlet flange 296 to the outlet nozzle 26. Also, such support feet 290 and 292 can be provided in the form of L-shaped brackets, including foot apertures defined by edge walls 297 suitable for mounting anchor bolts 298 to a selected substrate 299, as seen in FIG. 4.

As briefly mentioned above, a motor controller 110 is provided to adjustably set the speed of the motor 46 to drive impeller 60 or 60' at a predetermined rotational velocity. Normally, the motor 46 is, but need not necessarily be, an electric motor. The motor controller 110 is usually configured for continuous drive of the motor 46. However, the motor controller 110 is of the type suitable for adjustably controlling the speed at which the motor 46 drives the impeller 60 or 60'.

By use of the in-line blender described herein an improved method of dewatering of sludge can be practiced. This method includes providing an in-line blender downstream of a sludge pump 300 (see FIG. 12) and upstream of a sludge dewatering device 302. In the method, the speed of the impeller 60 or 60' is adjustably fixed. An additive such as polymer 202 to enhance the dewatering properties of the sludge 204 is combined with the sludge 204 at the in-line bender. The step of adjustably fixing the rate of addition of such additive is also important, since polymer or other additive savings can be enhanced. By controlling the amount of work done on the sludge/polymer mixture, sufficient, but not excessive amounts of work can be applied. This is important in some applications where excessive work might result in degradation of polymer molecular weight or other properties. The amount of work performed can be done via use of a load sensor for measuring the load on the in-line blender. Also, a controller 110 can be provided responsive to torque developed by the blender impeller 60 or 60', for operating the mixer drive 32 in response to the torque encountered in a particular application or at a particular time. The step of adjustably fixing the speed of the impeller includes providing a controller for manually or automatically varying the rotational speed of the impeller 60 or 60' of the in-line blender 20. Also, an additive controller may be provided suitable to vary and control the rate at which an additive such as polymer 202 is provided via pump 310.

Subsequent to the mixing step, the sludge/polymer mixture is subjected to the step of dewatering in a dewatering apparatus 302, such as a centrifuge 208. Alternately, the dewatering unit 302 can be practiced in the form of filtration, such as via a belt filter. The method is particularly applicable and useful for the treatment of a municipal wastewater treatment sludge.

Thus, the in-line blender described herein provides the necessary apparatus for carrying out a method for optimizing the application of polymer as used for solid/liquid separation in dewatering a particular wastewater sludge, to minimize the overall life cycle costs for dewatering, handling, hauling, and disposing of sludges or other dewatered solids. The method includes providing an in-line blender located between a sludge or solids feed pump and a dewatering apparatus and in fluid communication with each. A reagent is provided for addition to the solids or sludge for improving the dewatering characteristics thereof. First, it is important to measure the input variables, including (1) the rate of flow of a sludge to be dewatered, (2) the water content of said sludge, (3) the flow rate of a dilute reagent be mixed with the sludge, and (4) the water content of the dilute reagent stream (5) a mixing rate, as measured by rotational speed of said blender. Then, it is important to measure the output variables, including (1) sludge cake flow rate, (2) sludge cake dryness, (3) output water flow rate, and (4) solids content of output water, which variables are measured as achieved after a dewatering step subsequent to the step of blending polymer with the sludge or other solids. After such measurements, an operating point is located during operation to determine a characteristic operational range. Then, the reagent flow rate is adjustably fixed and reagent application rate is adjustably fixed, and the mixing rate is adjustably fixed, so as to bring the in-line blender and reagent application operating point into a range considered to be a stable and optimal operating range for mixing the sludge/polymer blend. Depending on the results of the treatment from the inputs on the sludge flow rate, the polymer flow rate, and mixing rate, the input variable are optimized to achieve a desirable throughput and sludge dryness result, in order to attain preselected economic and product specification goals.

In summary, the in-line sludge mixing apparatus and the method of employing such a blender in a method of dewatering materials such as sewage sludge is unique in that it separates the mixing work from the pumping work, and in that the impeller design is non-ragging and thus suitable for use in sewage sludge applications.

It is to be appreciated that the in-line blender system provided herein is an appreciable improvement in the art of the dewatering of sewage sludge. Although only a few exemplary embodiments have been described in detail, various details are sufficiently set forth in the drawings and in the specification provided herein to enable one of ordinary skill in the art to make and use the invention(s), which need not be further described by additional writing in this detailed description. It will be readily apparent to those skilled in the art that the in-line blender system may be modified from those embodiments provided herein without materially departing from the novel teachings and advantages provided. Thus, the aspects and embodiments described and claimed herein may be modified from those shown, and may be embodied in other specific forms without departing from the spirit or essential characteristics thereof. Therefore, the embodiments presented herein are to be considered in all respects as illustrative and not restrictive. As such, this disclosure is intended to cover the structures described herein and not only structural equivalents thereof, but also equivalent structures. Numerous modifications and variations are possible in light of the above teachings. It is therefore to be understood that within the scope of the appended claims, the invention(s) may be practiced otherwise than as specifically described herein. Thus, the scope of the invention(s), as set forth in the appended claims, and as indicated by the drawing and by the foregoing description, is intended to include variations from the embodiments provided which are nevertheless described by the broad interpretation and range properly afforded to the plain meaning of the claims set forth below.

What is claimed is:

1. A method comprising:
   (a) providing an in-line blender downstream of a sludge pump and upstream of a sludge dewatering apparatus, said in-line blender comprising (1) a blender housing, said blender housing having an inlet, an outlet, and a mixer mounting nozzle, (2) a mixer drive affixed to said mixer mounting nozzle, and (3) an impeller, mounted in cantilever configuration for rotation within said housing, said impeller having a rotating shaft extending along a longitudinal axis, from said mixer drive to a distal end, said impeller having a plurality of blades attached to said rotating shaft, said rotating shaft having an axially outermost blade and an axially innermost blade, said innermost blade having a proximal end located spaced apart from but closely adjacent said mixer drive, wherein said plurality of blades are configured to assure that, along the shaft axis, blades overlap lengthwise, so that within said housing, including from said proximal end of said innermost blade to said distal end of said rotating shaft, a bare rotating shaft is substantially avoided, so that by when in operation, ragging is prevented;
   (b) adjustably fixing the speed of the impeller of said in-line blender; and (c) combining an additive with said sludge at said in-line blender.

2. The method as set forth in claim 1, further comprising adjustably fixing the rate of addition of said additive.

3. The method as set forth in claim 1, further comprising dewatering the sludge in said dewatering apparatus.

4. The method as set forth in claim 3, wherein said dewatering apparatus comprises filtration.

5. The method as set forth in claim 1, wherein said dewatering apparatus comprises a centrifuge.

6. The method as set forth in claim 1, further characterized in that the sludge is a municipal wastewater treatment sludge.

7. The method of claim 1, wherein adjustably fixing said speed of said impeller includes providing a controller for manually or automatically varying the rotational speed of the impeller of said in-line blender.

8. The method of claim 2, further comprising providing an additive controller, said additive controller suitable for varying the rate of addition of additive.

9. The method as set forth in claim 1, wherein said additive is a polymer.

10. The method as set forth in claim 1, wherein adjustably fixing the rotational speed of the impeller provides for control of the amount of mixing work performed on said additive with respect to said sludge.

11. The method as set forth in claim 7, wherein the controller is responsive to torque developed by the blender impeller, for operating the mixer drive in response to said torque.

12. The method as set forth in claim 7, wherein the controller comprises a load sensor for measuring load on the in-line blender.

13. A method comprising:
(a) providing an in-line blender, said in-line blender located between a pump and a dewatering apparatus and in fluid communication with each;
(b) providing a reagent to be added to a sludge for improving the dewatering characteristics thereof;
(c) measuring input variables, including (1) a rate of flow of said sludge to be dewatered, (2) water content of said sludge, (3) a flow rate of said reagent to be mixed with the sludge, and (4) water content of the reagent stream (5) a mixing rate, as measured by rotational speed of said blender;
(d) measuring output variables, including (1) sludge cake flow rate, (2) sludge cake dryness, (3) output water flow rate, and (4) solids content of output water, which variables are measured as achieved after dewatering the sludge after blending said reagent with said sludge;
(e) locating an operating point resulting from the previous measurements during operation to determine a characteristic operational range,
(f) adjustably fixing a reagent flow rate, the reagent application rate, and the mixing rate, so as to bring the in-line blender and reagent application operating point into a range considered to be a stable and optimal operating range for mixing the sludge/polymer blend; and
(g) depending on the results of the dewatering of the sludge from the inputs on the sludge flow rate, the reagent flow rate, and mixing rate, optimizing the input variables to achieve a desirable throughput and sludge dryness result, in order to attain preselected economic and product specification goals.

14. The method as set forth in claim 13, wherein the reagent comprises a polymer.

* * * * *

UNITED STATES PATENT AND TRADEMARK OFFICE
CERTIFICATE OF CORRECTION

PATENT NO.         : 7,014,775 B2                                   Page 1 of 1
APPLICATION NO.    : 10/923260
DATED              : March 21, 2006
INVENTOR(S)        : Phil E. Sharpe, G. Dinnison and Steven Drury It is certified that error appears in the above-identified patent and that said Letters Patent is hereby corrected as shown below:

IN THE SPECIFICATION:

Column 5, line 38, after the word "provided", delete "a" and substitute therefore --as--.

Column 6, line 37, after the word "manner,", delete "the".

Column 7, line 52, after the words "mixed with the sludge,", delete "and".

Column 7, line 53, after the words "dilute reagent", delete "stream" and insert --stream, and--.

IN THE CLAIMS:

Column 10, line 7, after the words "of the reagent", delete "stream" and insert --stream, and--.

Signed and Sealed this
First Day of October, 2013

Teresa Stanek Rea
*Deputy Director of the United States Patent and Trademark Office*